United States Patent
Nada et al.

(10) Patent No.: US 10,442,288 B2
(45) Date of Patent: Oct. 15, 2019

(54) FUEL TANK FOR WORK VEHICLE

(71) Applicant: Kubota Corporation, Osaka-shi (JP)

(72) Inventors: Koji Nada, Sakai (JP); Takeshi Tsuchiya, Sakai (JP); Kazuyuki Tashiro, Sakai (JP); Hiroki Bessho, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 16/161,123

(22) Filed: Oct. 16, 2018

(65) Prior Publication Data

US 2019/0263254 A1 Aug. 29, 2019

(30) Foreign Application Priority Data

Feb. 26, 2018 (JP) .................. 2018/032398

(51) Int. Cl.
*B60K 15/03* (2006.01)
*B60K 15/04* (2006.01)

(52) U.S. Cl.
CPC .... *B60K 15/03006* (2013.01); *B60K 15/0406* (2013.01); *B60Y 2200/20* (2013.01)

(58) Field of Classification Search
CPC ................ B60K 15/03006; B60K 2015/03098
See application file for complete search history.

(56) References Cited

U.S. PATENT DOCUMENTS

| 7,048,140 B1 * | 5/2006 | Caldwell | B60T 11/22 215/308 |
| 7,261,093 B2 * | 8/2007 | Groom | F02M 25/08 123/519 |
| 7,350,511 B1 * | 4/2008 | Roche | A01D 34/82 123/516 |
| 7,461,754 B2 * | 12/2008 | Walsh | B65D 51/1616 215/261 |
| 8,220,649 B2 * | 7/2012 | Walsh | B26F 1/24 215/261 |
| 8,267,272 B2 * | 9/2012 | Seline | B65D 51/1616 215/261 |
| 9,193,260 B2 * | 11/2015 | Sotiriades | B60K 15/03504 |
| 9,365,109 B2 * | 6/2016 | Bork | B60K 15/0406 |
| 9,708,110 B2 * | 7/2017 | Walsh | B31D 1/0018 |
| 2017/0334286 A1 | 11/2017 | Tanaka | |

FOREIGN PATENT DOCUMENTS

JP 2017210033 A 11/2017

* cited by examiner

*Primary Examiner* — James A Shriver, II
*Assistant Examiner* — James J Triggs
(74) *Attorney, Agent, or Firm* — The Webb Law Firm

(57) ABSTRACT

A fuel tank for a work vehicle is disclosed. The fuel tank includes a tank body, an oil filling cylindrical portion protruding from the tank body, and an oil filler cap detachably attached to the oil filling cylindrical portion for opening/closing an oil filling opening of the oil filling cylindrical portion, A cap body of the oil filler cap has a tubular portion to be detachably fitted on the oil filling cylindrical portion and a lid portion formed at an upper end portion of the tubular portion for opening/closing the oil filling opening. A skirt portion extends from the cap body to opposite side to the lid portion relative to the tubular portion, a diameter of an extending end portion of the skirt portion being larger than a diameter of the tubular portion of the cap body.

5 Claims, 3 Drawing Sheets

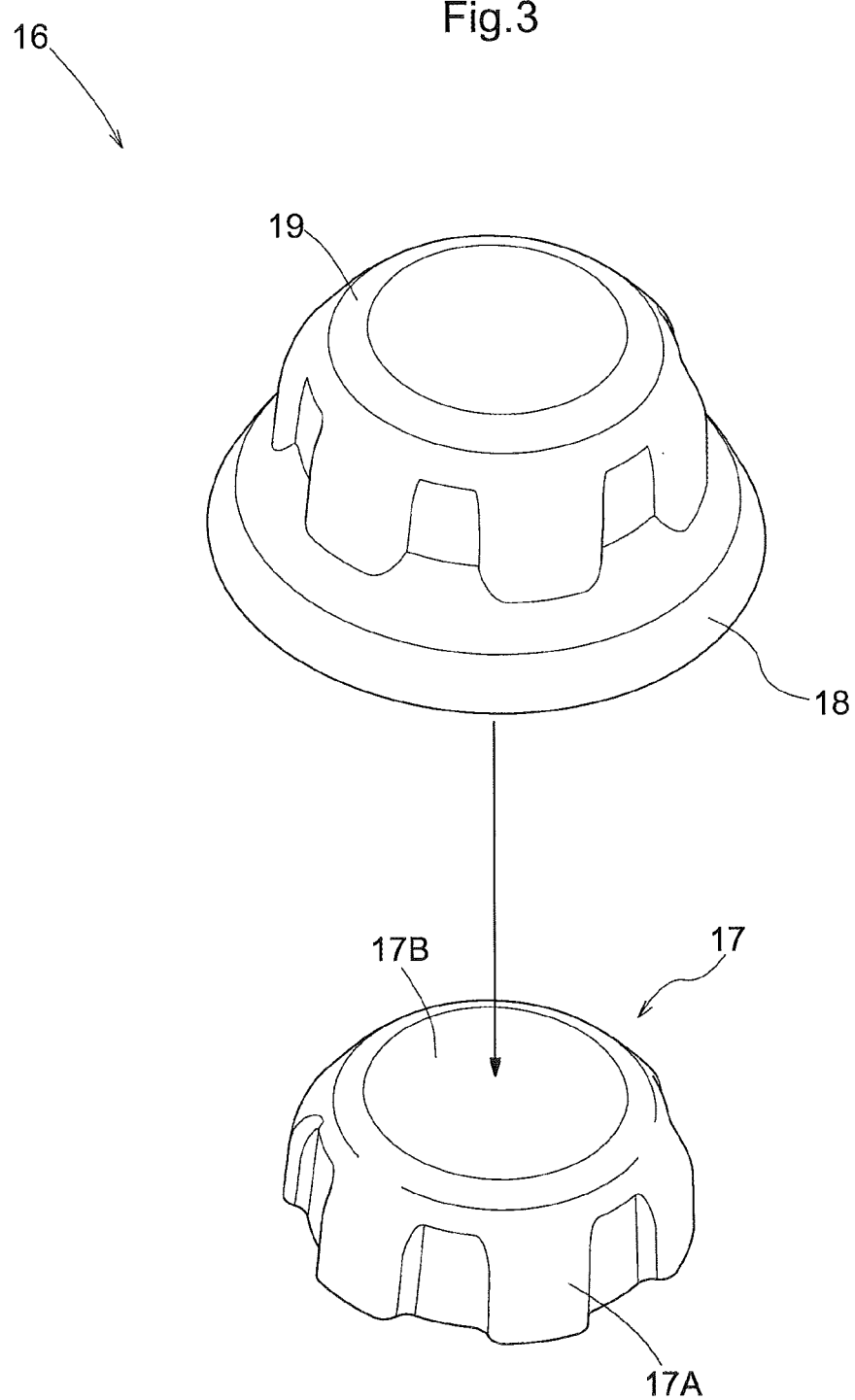

FUEL TANK FOR WORK VEHICLE

CROSS-REFERENCE TO RELATED APPLICATION

This application claims priority to Japanese Patent Application No. 2018-032398, filed Feb. 26, 2018, the disclosure of which is hereby incorporated in its entirety by reference.

BACKGROUND OF THE INVENTION

1. Field of the Invention

The present invention relates to a fuel tank having a tank body for storing an amount of engine fuel and mounted on a work vehicle.

2. Description of the Related Art

A fuel tank generally includes an oil filling cylindrical portion having an oil filling opening at its protruding end and an oil filler cap detachably fitted on the oil filling cylindrical portion for opening/closing the oil filling opening (see e.g. JP 2017-210033 A or US 2017/0334286 A1 corresponding thereto).

As a work vehicle travels in waterside or a puddle, muddy water or loose earth/sand can be often splashed up by a traveling device of the vehicle. If such splashed muddy water or earth/sand is flung to a fuel tank, it may hit the oil filler cap which closes the oil filling opening of the fuel tank and may get stuck thereto. Also, such splashed muddy water or sand/earth may stay at a portion around the oil filler cap of the fuel tank or a cover of the fuel tank. In such a case, when the oil filler cap removed from the tank comes into contact with the tank or the cover, the muddy water or earth/sand may adhere to the oil filler cap.

Conventionally, when muddy water or earth/sand is adhered to the cap, it tends to enter the inside of the oil filler cap. When the oil filler cap is attached again to the oil filling cylindrical portion, such water or earth/sand may drop through the oil filling opening to enter the tank. Then, there is a need for a fuel tank which can effectively resist intrusion of muddy water or earth/sand even if such muddy water or earth/sand gets adhered to the oil filler cap.

SUMMARY OF THE INVENTION

In view of the above, a following fuel tank is proposed:
A fuel tank for a work vehicle comprising:
a tank body for storing an amount of fuel for an engine of the work vehicle;
an oil filling cylindrical portion protruding from the tank body, the oil filling cylindrical portion having an oil filling opening at a protruding end portion thereof;
an oil filler cap detachably attached to the oil filling cylindrical portion for opening/closing the oil filling opening, the oil filler cap including:
 a cap body having a tubular portion to be detachably fitted on the oil filling cylindrical portion and a lid portion formed at an upper end portion of the tubular portion for opening/closing the oil filling opening, and
 a skirt portion extending from the cap body to opposite side to the lid portion relative to the tubular portion, a diameter of an extending end portion of the skirt portion being larger than a diameter of the tubular portion of the cap body.

With this arrangement, even if muddy water or earth/sand gets adhered to the oil filler cap, it will flow down along the skirt portion. And, the diameter of the extending end portion of this skirt portion is larger than the diameter of the tubular portion of the cap body. With this, the muddy water or earth/sand, as being guided to flow down by the flared shape of the skirt portion, even after reaching the lower end of the skirt portion will still retain a momentum toward the outer side of the oil filler cap, thus hardly entering the inner side of the skirt portion. Or, even if the muddy water or earth/sand should move to the inner side of the skirt portion, the inner side of the skirt portion will cause the muddy water or earth/sand to drop off the skirt portion in midway.

Therefore, even if muddy water or earth/sand gets stuck to the oil filler cap, it will not reach the inner side of the cap body and will not enter the tank.

According to one preferred embodiment, the oil filler cap has a connecting portion to be connected to the skirt portion; and the connecting portion is fitted on the cap body for attaching the skirt portion to the cap body.

With this arrangement, the skirt portion is attached to the cap body by the simple attachment arrangement—fitting the connecting portion on the cap body.

According to one preferred embodiment, the connecting portion comprises an elastic member providing an elastic resilience to be attached to the cap body.

With this arrangement, although this arrangement comprises simple attachment of the skirt portion to the cap body by only fitting the connecting portion on the cap body, the skirt portion can be supported by the cap body in a reliable manner under the elastic resilience of the connecting portion.

In the above, if the skirt portion is formed integrally in the connecting portion, there is formed no gap between the connecting portion and the skirt portion, so that muddy water or earth/sand will be allowed to flow down smoothly from the connecting portion to the skirt portion, without splashing.

Further and other features and advantages thereof will become apparent upon reading the following description.

For instance, at an end portion of the skirt portion opposite the extending end portion, there may be formed a flange portion engageable to a lower end of the cap body for preventing detachment of the connecting portion from the cap body.

Also, the present invention is directed also to a work vehicle (e.g. a utility vehicle) having the fuel tank having any one of the above-described arrangements.

BRIEF DESCRIPTION OF THE DRAWINGS

FIG. 3 is a perspective view showing a cap body, a skirt portion and a connecting portion.

DETAILED DESCRIPTION OF PREFERRED EMBODIMENTS

With reference to the accompanying drawings, one embodiment of a fuel tank of a work vehicle will be described next. In the illustrated embodiment, the work vehicle is configured as a utility vehicle (multi-purpose vehicle).

[General Configuration of Utility Vehicle]

Figure 1:
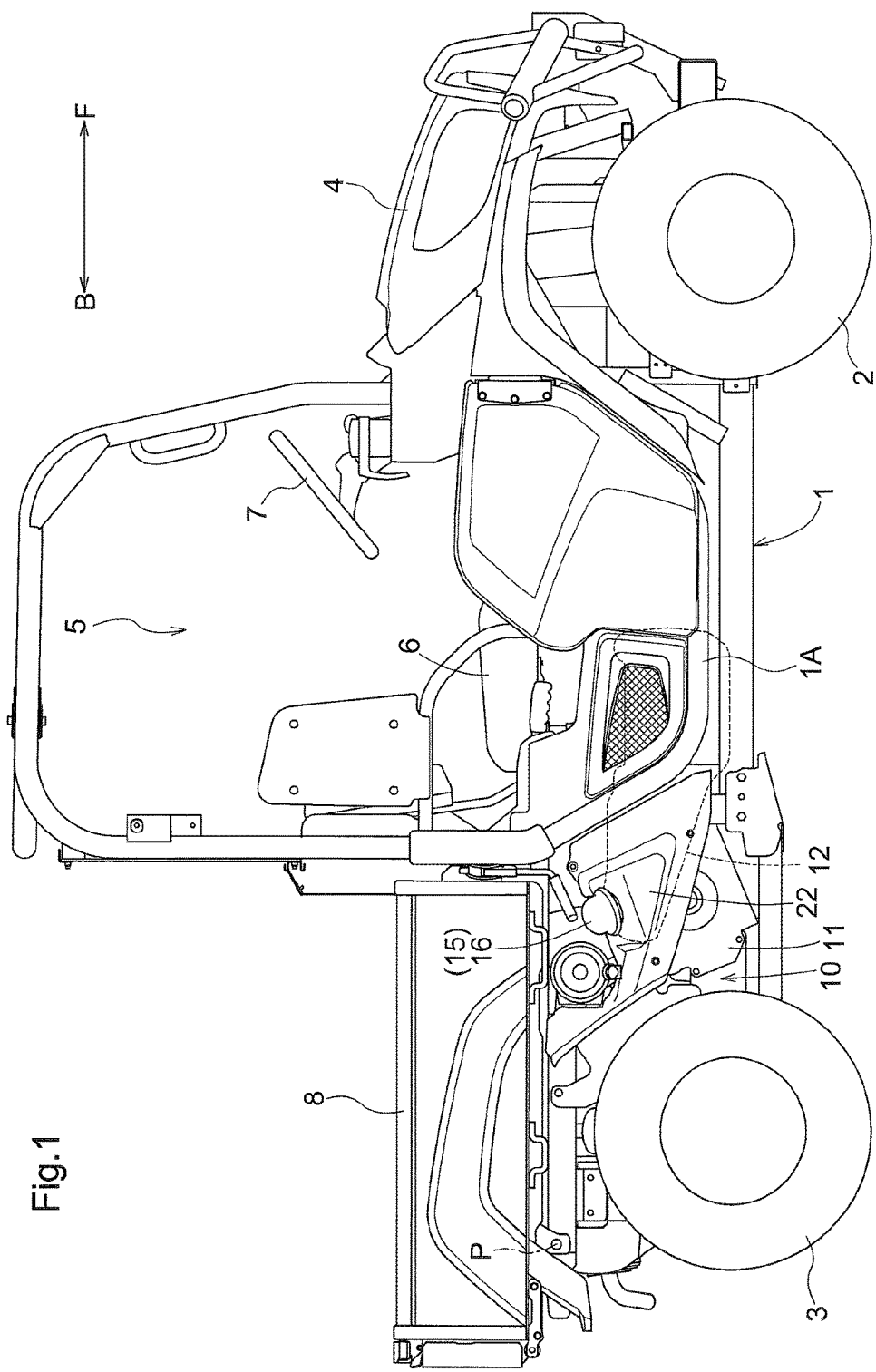
FIG. 1 is a right side view showing a utility vehicle, an example of a work vehicle, in its entirety.

In the following description, in connection with a vehicle body 1 of the utility vehicle, as shown in FIG. 1, the direction denoted with an arrow F is defined to represent "vehicle body front side", the direction denoted with an arrow B is defined to represent "vehicle body rear side", the direction on the near side of the illustration is defined to represent "vehicle body right side" and the direction on the far side of the illustration is defined to represent "vehicle body left side", respectively.

As shown in FIG. 1, the utility vehicle includes the vehicle body 1 having a vehicle body frame 1A comprised of a combination of pipe frame members, etc.; a pair of right and left front wheels 2 mounted at front portions of the vehicle body 1 to be steerable and drivable; and a pair of right and left rear wheels 3 mounted to rear portions of the vehicle body 1 to be drivable. At a front portion of the vehicle body 1, there is provided a front lid (front hood) 4 for covering the upper side such as the front portion of the vehicle body frame 1A. A driving section 5 is formed between the front wheels 2 and the rear wheels 3. At the driving section 5, there are provided a driver's seat 6 and a steering wheel 7 for steering the front wheels 2. At a rear portion of the vehicle body 1, a load carrying deck 8 is provided. The load carrying deck 8 is supported on the vehicle body frame 1A to be pivotally liftable up/down between an elevated discharging posture, in which a load carrying deck front end side is elevated relative to the vehicle body 1 about an axis P extending in a vehicle body width direction of a pivot shaft which is provided at a rear portion of the load carrying deck 8; and a lowered loading posture, in which the load carrying deck front end side is lowered relative to the vehicle body 1. At a position under the load carrying deck 8 in the rear portion of the vehicle body 1, there is formed an engine section 10 having an engine 11 which outputs power to the front wheels 2 and the rear wheels 3. At a right side portion of the vehicle body 1, there is mounted a fuel tank 12 for the engine.

[Arrangement of Fuel Tank 12]

As shown in FIG. 1, the fuel tank 12 is provided between the lower side of a seat supporting portion provided at the driving section 5, and the front vicinity of the rear wheels 3. A portion of the fuel tank 12 that protrudes rearwards from the driving section 5 is covered by a tank cover 22.

Figure 2:
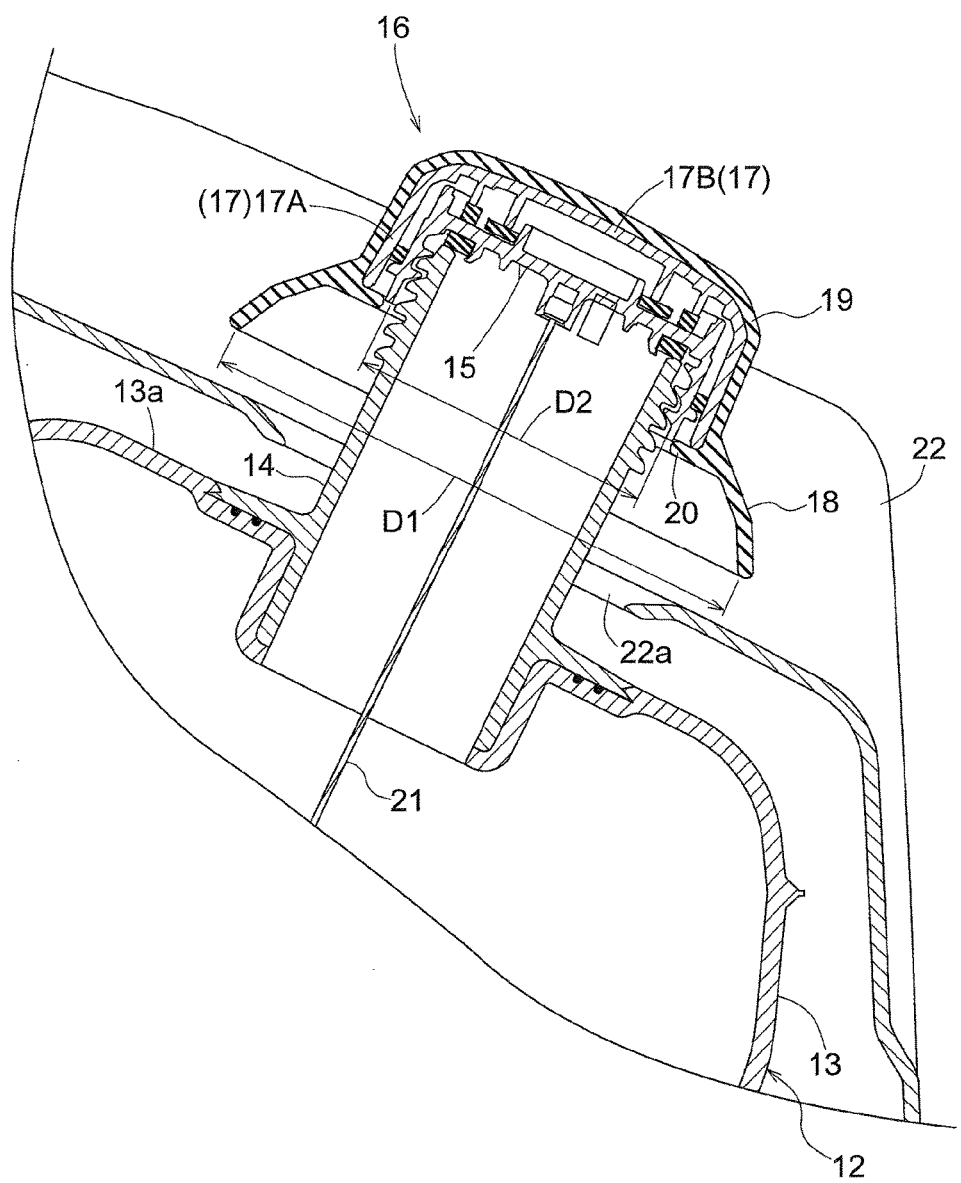
FIG. 2 is a view in vertical section showing an oil filling portion of a fuel tank.

As shown in FIG. 2, the fuel tank 12 includes an oil filling cylindrical portion 14 which protrudes upwards from an upper wall portion 13a of a tank body 13, and an oil filler cap 16 for opening/closing an oil filling opening 15 provided at the protruding end portion (upper end portion) of the oil filling cylindrical portion 14. The protruding end portion of the oil filling cylindrical portion 14 is exposed to the outer side of the tank cover 22 via an opening 22a of the tank cover 22. As shown in FIG. 1, the oil filling opening 15 is located between the driving section 5 and the rear wheels 3.

At the fuel tank 12, as an amount of engine fuel to be supplied to the engine 11 is charged via the oil filling opening 15 into the oil filling cylindrical portion 14, the engine fuel will flow through the oil filling cylindrical portion 14 into the tank body 13 to be stored in this tank body 13.

[Arrangement of Oil Filler Cap 16]

As shown in FIG. 2, the oil filler cap 16 includes a cap body 17 and a skirt portion 18.

As shown in FIG. 2 and FIG. 3, the cap body 17 has a tubular portion 17A to be detachably fitted on the oil filling cylindrical portion 14 from the upper side of the protruding end portion (upper end portion) of the oil filling cylindrical portion 14, and a lid portion 17B formed at an upper end portion of the tubular portion 17A. The tubular portion 17A and the lid portion 17B together form a double (two-layer cap) structure.

As shown in FIG. 2, the skirt portion 18 extends from the cap body 17A to opposite side to the lid portion 17B relative to the tubular portion 17A. A diameter D1 of an extending end portion of the skirt portion 18 is larger than a diameter D2 of the tubular portion 17A. The skirt portion 18 has a flared shape.

As shown in FIG. 2 and FIG. 3, the skirt portion 18 has a connecting portion 19 connected to the upper end portion of the skirt portion 18, and the skirt portion 18 is attached to the cap body 17 via the connecting portion 19.

More particularly, the connecting portion 19 is formed like a downwardly opened container; and as the connecting portion 19 is fitted on the cap body 17 from above, the connecting portion 19 is connected to the cap body 17. The connecting portion 19 is formed of a rubber member as an example of an elastic member. Whereby, the connecting portion 19 is connected to the cap body 17 as the connecting portion 19 is fitted thereto via elastic resilience of the elastic member. The skirt portion 18 and the connecting portion 19 are connected to each other as being formed integral. The skirt portion 18 is attached to the cap body 17 via the connecting portion 19. Within an upper portion of the skirt portion 18, there is provided a flange portion 20 engageable to a lower end of the cap body 17 for preventing detachment of the connecting portion 19 from the cap body 17. The flange portion 20 is formed of a rubber member. When the connecting portion 19 is to be fitted on the cap body 17, the flange portion 20 will be elastically deformed in a diameter increasing manner. In this way, the flange portion 20 allows fitting of the connecting portion 19 to the cap body 17.

When the oil filler cap 16 is fitted to the oil filling cylindrical portion 14 from above via the opening of the skirt portion 18, the cap body 17 will be fitted on the oil filling cylindrical portion 14, and a threaded portion formed in the inner circumferential portion of the tubular portion 17A will come into engagement (meshing) with a threaded portion formed in the outer circumferential portion of the oil filling cylindrical portion 14. Then, the oil filling opening 15 will be closed by the lid portion 17B, so that the oil filling opening 15 can be closed by the oil filler cap 16, and the oil filler cap 16 can be fixed to the oil filling cylindrical portion 14. With the arrangement, when muddy water or earth/sand gets stuck to the outer circumference of the oil filler cap 16 when e.g. being splashed up by the rear wheels 3, such muddy water or earth/sand will flow down the outer circumference of the oil filler cap 16. And, even if the muddy water or earth/sand even should reach the lower end of the skirt portion 18, such muddy water or earth/sand will still retain a momentum toward the outer side of the oil filler cap 16 as being guided to flow down by the flared shape of the skirt portion 18. Whereby, such muddy water or earth/sand will not move to the inner side of the oil filler cap 16, but will be caused to drop off the skirt portion 18. Thus, even if the muddy water or earth/sand should move to the inner side of the skirt portion 18, the inner side of the skirt portion 18 will cause the muddy water or earth/sand to drop off the skirt portion 18 in midway, not reaching the cap body 17.

When the oil filler cap 16 is removed from the oil filling cylindrical portion 14, the cap body 17 will be withdrawn from the oil filling cylindrical portion 14 to open up the oil filling opening 15. In this case, the oil filler cap 16 will be supported and suspended by a wire 21 connected to the lid portion 17B, thus inadvertent dropping of the oil filler cap 16 will be prevented.

[Other Embodiments]

(1) In the foregoing embodiment, the skirt portion 18 is attached to the cap body 17 via the connecting portion 19. The invention is not limited thereto. It is also possible to employ an arrangement in which, with omission of the connecting portion 19, the skirt portion 18 is directly connected to the cap body 17.

(2) In the foregoing embodiment, the connecting portion 19 is fitted to the cap body 17 via an elastic member. The invention is not limited thereto. It is also possible to employ an arrangement in which the connecting portion 19 is not provided with elasticity, and the connecting portion 19 is connected to the cap boy 17 via an adhesive.

(3) In the foregoing embodiment, the connecting portion 19 and the skirt portion 18 are formed integral with each other. Instead, the connecting portion 19 and the skirt portion 18 may be made separately and connected to each other.

(4) The work vehicle is not limited to a utility vehicle, but can be any other work vehicle such as a tractor, a combine, a rice planter, a transporter vehicle, etc.

What is claimed is:

1. A fuel tank for a work vehicle comprising:
    a tank body for storing an amount of fuel for an engine of the work vehicle;
    an oil filling cylindrical portion protruding from the tank body, the oil filling cylindrical portion having an oil filling opening at a protruding end portion thereof;
    an oil filler cap detachably attached to the oil filling cylindrical portion for opening/closing the oil filling opening, the oil filler cap including:
        a cap body having a tubular portion to be detachably fitted on the oil filling cylindrical portion and a lid portion formed at an upper end portion of the tubular portion for opening/closing the oil filling opening,
        a connecting portion fitted on the cap body, and
        a skirt portion connected to the connecting portion, the skirt portion extending from the connecting portion to an opposite side to the lid portion relative to the tubular portion, a diameter of an extending end portion of the skirt portion being larger than a diameter of the tubular portion of the cap body;
    wherein the connecting portion is configured to attach the skirt portion to the cap body; and
    wherein the connecting portion comprises an elastic member providing an elastic resilience to be attached to the cap body.

2. The fuel tank of claim 1, wherein at an end portion of the skirt portion opposite the extending end portion, there is formed a flange portion engageable with a lower end of the cap body for preventing detachment of the connecting portion from the cap body.

3. A work vehicle comprising:
    a vehicle body;
    an engine mounted on the vehicle body;
    a fuel tank mounted on the vehicle body for storing an amount of fuel for the engine, the fuel tank including:
        a tank body;
        an oil filling cylindrical portion protruding from the tank body, the oil filling cylindrical portion having an oil filling opening at a protruding end portion thereof;
        an oil filler cap detachably attached to the oil filling cylindrical portion for opening/closing the oil filling opening, the oil filler cap including:
            a cap body having a tubular portion to be detachably fitted on the oil filling cylindrical portion and a lid portion formed at an upper end portion of the tubular portion for opening/closing the oil filling opening,
            a connecting portion fitted on the cap body, and
            a skirt portion connected to the connecting portion, the skirt portion extending from the connecting portion to an opposite side to the lid portion relative to the tubular portion, a diameter of an extending end portion of the skirt portion being larger than a diameter of the tubular portion of the cap body;
    wherein the connecting portion is configured to attach the skirt portion to the cap body; and
    wherein at an end portion of the skirt portion opposite the extending end portion, there is formed a flange portion engageable with a lower end of the cap body for preventing detachment of the connecting portion from the cap body.

4. The work vehicle claim 3, wherein the connecting portion comprises an elastic member providing an elastic resilience to be attached to the cap body.

5. A fuel tank for a work vehicle comprising:
    a tank body for storing an amount of fuel for an engine of the work vehicle;
    an oil filling cylindrical portion protruding from the tank body, the oil filling cylindrical portion having an oil filling opening at a protruding end portion thereof;
    an oil filler cap detachably attached to the oil filling cylindrical portion for opening/closing the oil filling opening, the oil filler cap including:
        a cap body having a tubular portion to be detachably fitted on the oil filling cylindrical portion and a lid portion formed at an upper end portion of the tubular portion for opening/closing the oil filling opening,
        a connecting portion fitted on the cap body, and
        a skirt portion connected to the connecting portion, the skirt portion extending from the connecting portion to an opposite side to the lid portion relative to the tubular portion, a diameter of an extending end portion of the skirt portion being larger than a diameter of the tubular portion of the cap body;
    wherein the connecting portion is configured to attach the skirt portion to the cap body; and
    wherein at an end portion of the skirt portion opposite the extending end portion, there is formed a flange portion engageable with a lower end of the cap body for preventing detachment of the connecting portion from the cap body.

* * * * *